United States Patent
Huang-Fu (10) Patent No.: US 12,464,407 B2
(45) Date of Patent: Nov. 4, 2025

(54) HANDLING OF URSP REGARDING S-NSSAI AND PDU TYPE

(71) Applicant: MEDIATEK INC., Hsin-Chu (TW)

(72) Inventor: Chien-Chun Huang-Fu, Hsin-Chu (TW)

(73) Assignee: MEDIATEK INC. (TW)

( * ) Notice: Subject to any disclaimer, the term of this patent is extended or adjusted under 35 U.S.C. 154(b) by 0 days.

(21) Appl. No.: 17/584,241

(22) Filed: Jan. 25, 2022

(65) Prior Publication Data

US 2022/0272576 A1 Aug. 25, 2022

Related U.S. Application Data

(60) Provisional application No. 63/200,228, filed on Feb. 23, 2021.

(51) Int. Cl.
*H04W 28/08* (2023.01)
*H04W 40/02* (2009.01)

(52) U.S. Cl.
CPC ... *H04W 28/0925* (2020.05); *H04W 28/0831* (2020.05); *H04W 40/026* (2013.01)

(58) Field of Classification Search
CPC ..... H04W 48/18; H04W 60/04; H04W 76/10; H04W 40/02; H04W 28/0925; H04W 28/0831; H04W 40/026; H04L 2101/375; H04L 45/306; H04L 67/141
See application file for complete search history.

(56) References Cited

U.S. PATENT DOCUMENTS

| | | | | |
|---|---|---|---|---|
| 10,999,776 | B2 * | 5/2021 | Jagannatha | H04L 41/0894 |
| 11,006,344 | B2 * | 5/2021 | Huang-Fu | H04W 76/20 |
| 11,310,843 | B2 * | 4/2022 | Li | H04W 60/005 |
| 11,469,994 | B2 * | 10/2022 | Wang | H04L 45/42 |
| 11,470,657 | B2 * | 10/2022 | Youn | H04W 8/08 |
| 2020/0359295 | A1 | 11/2020 | Huang-Fu | H04W 40/12 |
| 2021/0120596 | A1 * | 4/2021 | Youn | H04W 76/12 |
| 2021/0184965 | A1 * | 6/2021 | Wang | H04W 40/20 |

(Continued)

OTHER PUBLICATIONS

Taiwan IPO, office action for the Taiwanese patent application 111105200 (no English translation is available), dated Aug. 15, 2022 (20 pages).

(Continued)

*Primary Examiner* — Jung Liu
(74) *Attorney, Agent, or Firm* — Helen Mao; Zheng Jin; Imperium Patent Works (57) ABSTRACT

A method for UE route selection policy (URSP) rule matching regarding S-NSSAI and PDU session type is proposed. When an application is executed, a UE finds an RSD of a matching URSP rule, and the association of the application with an existing PDU session should have some exceptions. In one example, regarding S-NSSAI, if there's only a single allowed S-NSSAI or the UE is aware of the default S-NSSAI, the UE can associate the PDU session with the application where the existing PDU session is established with an S-NSSAI provided by the UE, but the RSD doesn't include any S-NSSAI. In another example, regarding PDU session type, the PDU session type IPv4v6 in the RSD can match with PDU session type IPv4 or IPv6 of the PDU session, which was established when the UE requested IPv4v6 during the PDU session establishment.

4 Claims, 4 Drawing Sheets

(56) References Cited

U.S. PATENT DOCUMENTS

2022/0086744 A1\* 3/2022 Youn .................... H04W 12/75
2022/0272031 A1\* 8/2022 Miklós ................. H04L 45/306
2022/0272623 A1\* 8/2022 Watfa ................... H04W 48/18

OTHER PUBLICATIONS

3GPP, "3GPP TS 24.526 V17.1.0; Technical Specification Group Core Network and Terminals; User Equipment (UE) policies for 5G System (5GS); Stage 3 (Release 17)", figure 4.4.2.2, chapters 4.1, 4.2.2.2, 4.4.1, 4.4.2, dated Dec. 2020 (52 pages).

3GPP, "3GPP TS 23.501 V16.7.0; Technical Specification Group Services and System Aspects; System architecture for the 5G System (5GS); Stage 2 (Release 16)", chapter 5.15.3, dated Dec. 2020 (442 pages).

\* cited by examiner

| PRECEDENCE VALUE | THE PRECEDENCE OF THEURSP RULE AMONG ALL EXISTING URSP RULES |
|---|---|
| TRAFFIC DESCRIPTOR | MATCH ALL TRAFFIC DESCRIPTOR |
|  | APPLIATION IDENTIFIERS<br>IP TUPLES<br>NON-IP DESCRIPTORS<br>DNNS<br>CONNECTION CAPABILITIES<br>DOMAIN DESCRIPTORS |
| ROUTE SELECTION DESCRIPTORS | PRECEDENCE VALUE<br>    SSC MODE<br>    S-NSSAIS<br>    DNNS<br>    PDU SESSION TYPE<br>    PREFERRED ACCESS TYPE<br>    MULTI-ACCESS PREFERENCE<br>NON-SEAMLESS NON-3GPP OFFLOAD INDICATION |

FIG. 7 ern of the URSP which may not best fit the application.

HANDLING OF URSP REGARDING S-NSSAI AND PDU TYPE

CROSS REFERENCE TO RELATED APPLICATIONS

This application claims priority under 35 U.S.C. § 119 from U.S. Provisional Application No. 63/200,228, entitled "Handling of URSP Regarding S-NSSAI and PDU Type", filed on Feb. 23, 2021, the subject matter of which is incorporated herein by reference.

TECHNICAL FIELD

The disclosed embodiments relate generally to wireless communication, and, more particularly, to method of handling UE route selection policy (URSP) regarding S-NSSAI and PDU type in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems (5GS).

The UE policies for 5GS include UE route selection policy (URSP) and access network discovery and selection policy (ANDSP). The UE policies can be delivered form a Policy Control Function (PCF) to UE. PCF takes care of network policies to manage network behavior. PCF gets the subscription information from Unified Data Management (UDM). PCF interfaces to both Access and Mobility Function (AMF) to manage the mobility context and Session Management Function (SMF) to manage the session contexts. PCF also plays a crucial role in providing a schema for network slicing and roaming. PCF triggers the URSP which enables the UE to determine how a certain application should be handled in the context of an existing or new Protocol Data Unit (PDU) session. The UE policies can also be pre-configured in UE. The pre-configured policy should be applied by UE only when UE has not received the same type of policy from the PCF.

A PDU session defines the association between the UE and the data network that provides a PDU connectivity service. Each PDU session is identified by a PDU session ID, and includes one or more QoS flows and QoS rules. When an application is executed, the upper layer sends the application information to the URSP entity for matching a URSP rule (i.e., by evaluating the traffic descriptor; TD), and use the corresponding RSD (Route Selection Descriptor) to establish a PDU session. The UE tries to reuse the existing PDU session. Otherwise, there may be duplicated PDU sessions; or the network may reject the PDU session establishment request, which causes signaling overhead; or the UE may select the next RSD or URSP, which may not best fit the application.

A solution is sought.

SUMMARY

A method for UE route selection policy (URSP) rule matching regarding Single-Network Slice Selection Assistance Information (S-NSSAI) and Protocol Data Unit (PDU) session type is proposed. When an application is executed, the upper layer of a UE sends the application information to URSP entity for matching a URSP rule. The UE finds an RSD of the matching URSP rule, and the UE tries to reuse an existing PDU session, e.g., the association of the application with the existing PDU session have certain exceptions. In one example, regarding S-NSSAI, if there's only a single allowed S-NSSAI or the UE is aware of the default S-NSSAI, the UE can associate the PDU session with the application where the existing PDU session is established with an S-NSSAI provided by the UE, but the RSD doesn't include any S-NSSAI. In another example, regarding PDU session type, the PDU session type IPv4v6 in the RSD can match with PDU session type IPv4 or PDU session type IPv6 of the existing PDU session, which was established when the UE requested IPv4v6 during the PDU session establishment.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
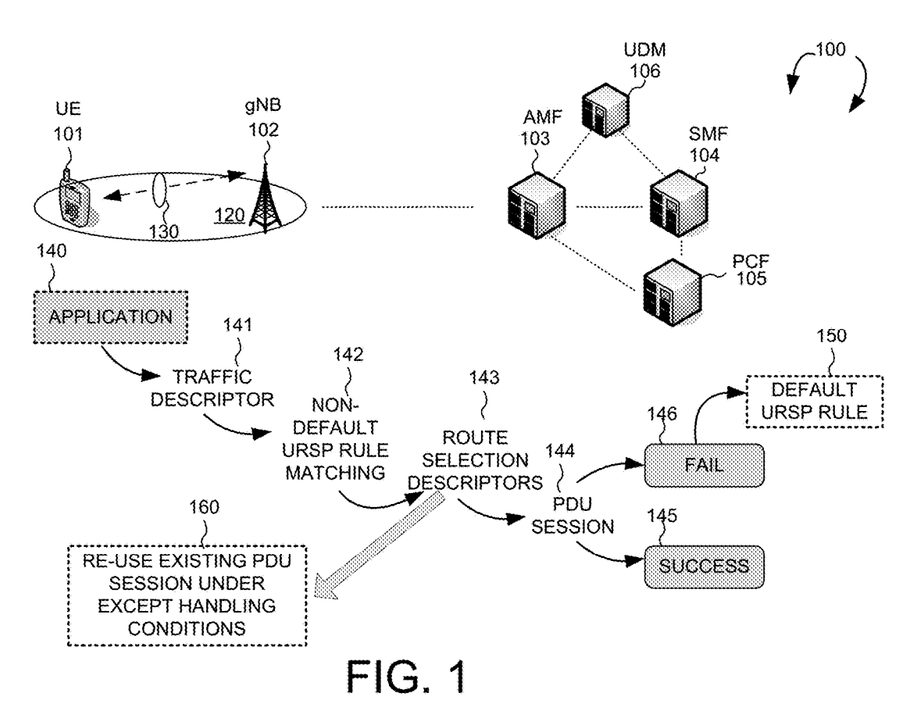
FIG. 1 illustrates an exemplary 5G network supporting User Equipment (UE) route selection policy (URSP) handling regarding Single-Network Slice Selection Assistance Information (S-NSSAI) and Protocol Data Unit (PDU) session type in 5G new radio (NR) systems in accordance with one novel aspect.

FIG. 1 illustrates an exemplary 5G network 100 supporting enhanced User Equipment (UE) route selection policy (URSP) handling regarding Single-Network Slice Selection Assistance Information (S-NSSAI) and Protocol Data Unit (PDU) session type in 5G new radio (NR) systems in accordance with one novel aspect. 5G new radio (NR) network 100 comprises a user equipment UE 101, a base station gNB 102, an access and mobility management function (AMF) 103, a session management function (SMF) 104, a policy control function (PCF) 105, and a unified data management (UDM) 106. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF 103 communicates with gNB 102 and 5GC 104 for access and mobility management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins 5GS network, a Packet Data Network (PDN) address (i.e., the one that can be used on the PDN) is assigned to the UE for its connection to the PDN. In 4G, EPS has defined a Default EPS Bearer to provide the IP Connectivity that is Always-On. In 5G, a Protocol Data Unit (PDU) session establishment procedure is a parallel procedure of a PDN connection procedure in 4G. A PDU session (e.g., 130) defines the association between the UE and the data network that provides a PDU connectivity service. Each PDU session is identified by a PDU session ID, and may include multiple QoS flows and QoS rules.

The UE policies for 5GS include UE route selection policy (URSP) and access network discovery and selection policy (ANDSP). The UE policies can be delivered form Policy Control Function (PCF) to UE. PCF takes care of network policies to manage network behavior. PCF gets the subscription information from Unified Data Management (UDM). PCF interfaces to both Access and Mobility Function (AMF) to manage the mobility context and Session Management Function (SMF) to manage the session contexts. PCF also plays a crucial role in providing a scheme for network slicing and roaming. PCF triggers the URSP which enables the UE to determine how a certain application should be handled in the context of an existing or new Protocol Data Unit (PDU) session. The UE policies can also be pre-configured in UE. The pre-configured policy should be applied by UE only when UE has not received the same type of policy from the PCF.

When UE 101 starts application 140, UE upper layers trigger URSP rule matching. UE 101 evaluates the URSP rules, except the default URSP rule, with a traffic descriptor matching the application information in increasing order of their precedence values. If UE 101 finds the traffic descriptor (141) in a non-default URSP rule (142) matching the application information, and an established PDU session matching at least one of the route selection descriptors (143) of the URSP rule, the UE then provides information on the PDU session that matches the route selection descriptor of the lowest precedence value to the upper layers. Otherwise the UE selects a route selection descriptor with the next smallest precedence value which has not been evaluated. If no non-default matching URSP rule can be found and if UE local configuration for the application is available, UE 101 should perform the association of the application to a PDU session accordingly. If no matching PDU session exists, the UE NAS layer should attempt to establish a PDU session 144 using UE local configuration. If the PDU session establishment is successful (145), the UE NAS layer should provide information of the successfully established PDU session to the upper layers. Otherwise, if no non-default matching URSP rule can be found and if either UE local configuration for the application is not available or the PDU session establishment based on UE local configuration for the application fails (146), UE 101 should perform the association of the application to a PDU session or to non-seamless non-3GPP offload according to the default URSP rule with the "match-all" traffic descriptor (150). If the association is unsuccessful, UE 101 informs the upper layers.

UE 101 tries to reuse an existing PDU session when the application is executed and the upper layer sends the application information to the URSP entity for matching a URSP rule (160). Otherwise, there may be duplicated PDU sessions; or the network may reject the PDU session establishment request, which causes signaling overhead; or the UE may select the next RSD or URSP, which may not best fit the application. In one novel aspect, when an application is executed, UE finds an RSD of a matching URSP rule, and the association of the application with the existing PDU session should have certain exceptions. In general, the existing PDU session should have parameters that match with the RSD of the matching URSP rule; however, under the exceptions, the PDU session can be associated with the application even if no exact match. In one example, regarding S-NSSAI, if there's only a single allowed S-NSSAI or the UE is aware of the default S-NSSAI, the UE can associate the PDU session with the application where the existing PDU session is established with an S-NSSAI provided by the UE, but the RSD doesn't include any S-NSSAI (while the other parameters are the same). In another example, regarding PDU session type, the PDU session type IPv4v6 in the RSD can match with PDU session type IPv4 or PDU session type IPv6 of the PDU session, which was established when the UE requested IPv4v6 during the PDU session establishment.

Figure 2:
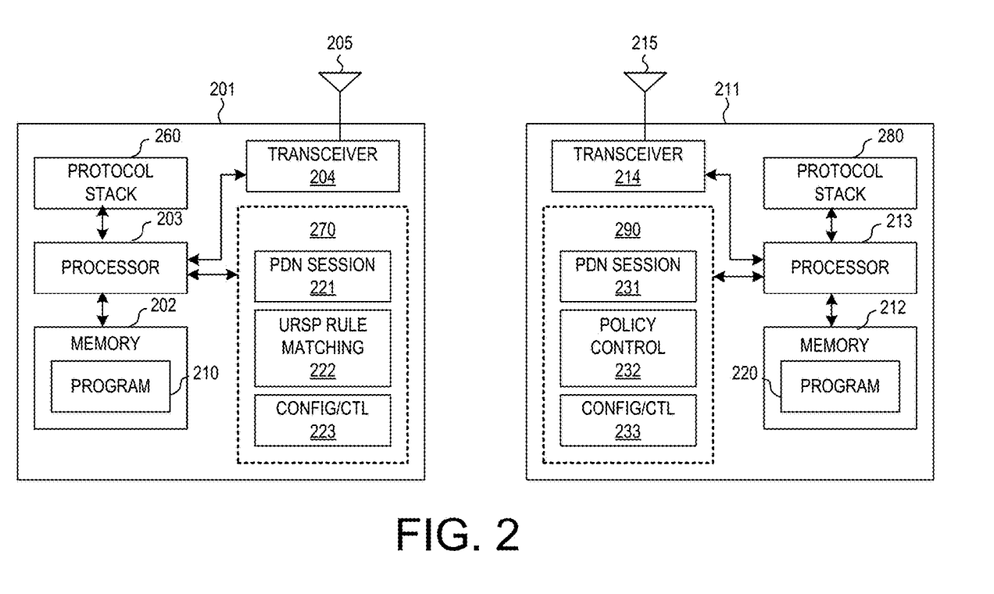
FIG. 2 illustrates simplified block diagrams of a user equipment (UE) and a base station in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session handling circuit 231 handles PDU session establishment and modification procedures. Policy control module 232 that configures policy rules for UE. Configuration and control circuit 233 provides different parameters to configure and control UE of related functionalities including mobility management and session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise application layer and other upper layers to manage different applications, Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, the upper layer entities request information of the PDU session via which to send a PDU of an application, system modules and circuits 270 comprise a PDU session handling circuit 221 that performs PDU session establishment and modification procedures with the network, a URSP rule matching circuit 222 that performs URSP rule matching, and a configuration and control circuit 223 that handles configuration and control parameters for mobility management and session management.

Figure 3:
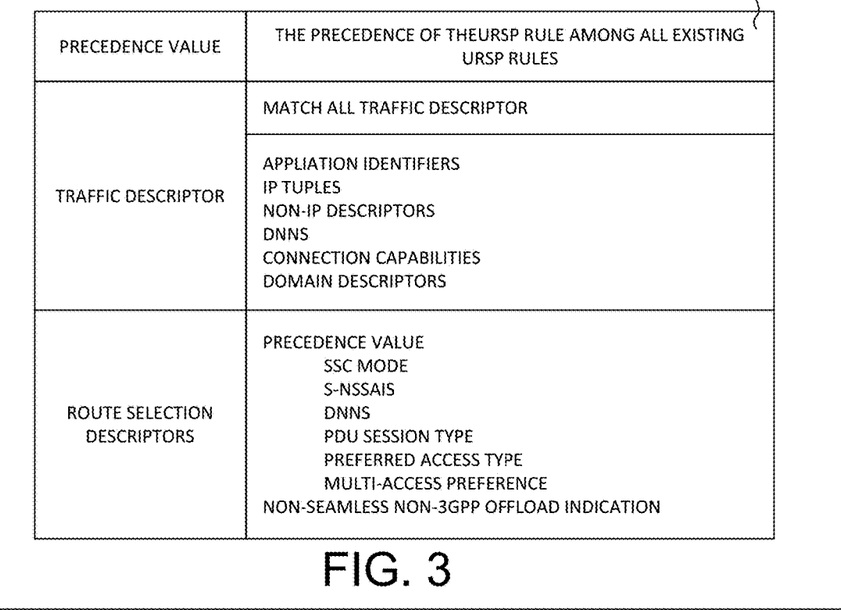
FIG. 3 illustrates the content of a URSP rule as defined in 3GPP specification.

FIG. 3 illustrates the content of a URSP rule as defined in 3GPP specification. URSP is defined as a set of one or more URSP rules. As depicted by Table 300, each URSP rule is composed of: 1) a precedence value of the URSP rule identifying the precedence of the URSP rule among all the existing URSP rules; 2) a traffic descriptor; and 3) one or more route selection descriptors. The traffic descriptor includes either 1) a match-all traffic descriptor; or 2) at least one of the following components: A) one or more application identifiers; B) one or more IP 3 tuples, i.e., the destination IP address, the destination port number, and the protocol used above the IP; C) one or more non-IP descriptors, i.e., destination information of non-IP traffic; D) one or more DNNs; E) one or more connection capabilities; and F) one or more domain descriptors, i.e., destination FQDN(s). Each route selection descriptor includes a precedence value of the route selection descriptor and either 1) one PDU session type and, optionally, one or more of the followings: A) SSC mode; B) one or more S-NSSAIs; C) one or more DNNs; D) preferred access type; and E) multi-access preference; or 2) non-seamless non-3GPP offload indication. Only one URSP rule in the URSP can be a default URSP rule and the default URSP rule should contain a match-all traffic descriptor. If a default URSP rule and one or more non-default URSP rules are included in the URSP, any non-default URSP rule should have lower precedence value (i.e., higher priority) than the default URSP rule.

Figure 4:
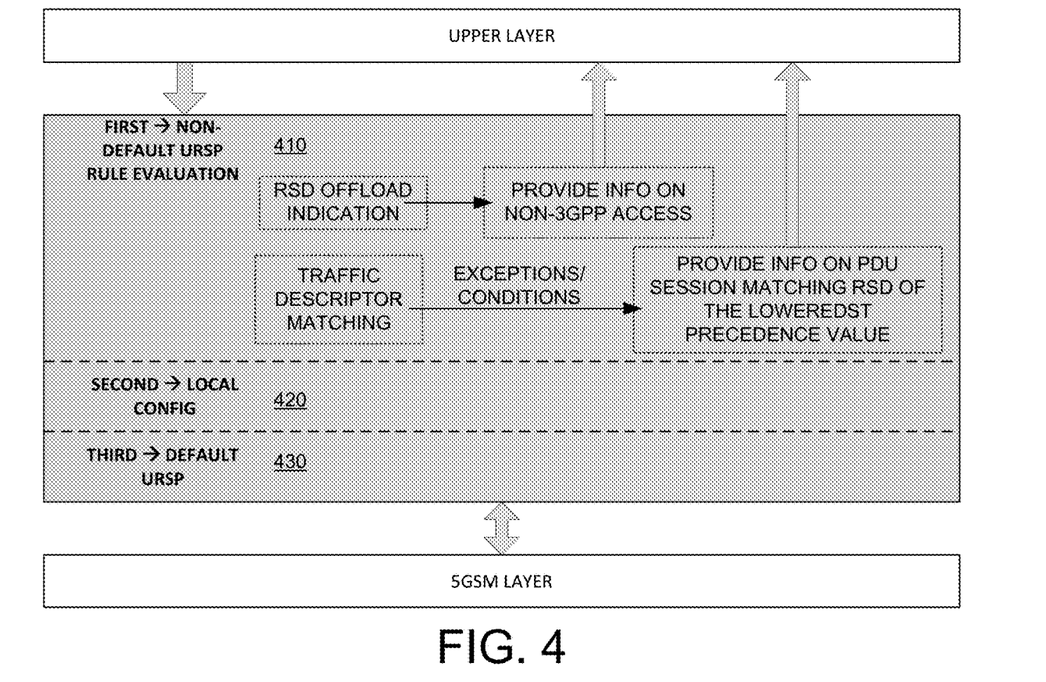
FIG. 4 illustrates different layers inside a UE for supporting URSP handling regarding S-NSSAI and PDU type in accordance with one novel aspect of the present invention.

FIG. 4 illustrates different layers inside a UE for supporting URSP handling regarding S-NSSAI and PDU type in accordance with one novel aspect of the present invention. URSP is used by the UE to determine if a detected application can be associated to an established PDU session, can be offload to non-3GPP access outside a PDU session, or can trigger the establishment of a new PDU session. A URSP rule includes one traffic descriptor that specifies the matching criteria and one or more of the following components: SSC mode selection policy to associated the matching application with SSC mode, network slice selection policy to associated the matching application with S-NSSAI, DNN selection policy to associated the matching application with DNN, PDU session type policy to associated the matching application with a PDU session type, non-seamless offload policy to determine that the matching application should be non-seamlessly offloaded to non-3GPP access (i.e., out of a PDU session), and access type preference indicating a preferred access (3GPP or non-3GPP) when UE needs to establish a new PDU session for the matching application.

In order to send a PDU of an application, the upper layers request information on the PDU session (e.g., PDU address) via which to send a PDU of the application. When the upper layer request information of the PDU session via which to send a PDU of an application, information on the non-3GPP access outside of a PDU session shall be provided to the upper layers, without evaluating the URSP rules, if due to UE local configuration non-seamless non-3GPP offload is requested. Otherwise, the UE should proceed in the following order.

First step (410), the UE shall evaluate the URSP rules, except the default URSP rule, with a traffic descriptor matching the application information in increasing order of their precedence values, if any. If the traffic descriptor contains more than one traffic descriptor component type, each of a different type, all of them shall be matched. If the traffic descriptor contains more than one traffic descriptor component of the same traffic descriptor component type, at least one of the traffic descriptor components of the same traffic descriptor component type shall be matched with the application information. A URSP rule is determined not to be applicable when for any given component in the traffic descriptor no corresponding information from the application is available or the corresponding information from the application does not match any of the values in the traffic descriptor component. If the UE finds the traffic descriptor in a non-default URSP rule matching the application information, the UE shall provide information on the non-3GPP access outside of a PDU session to the upper layers, and the UE shall provide information on the PDU session that matches the route selection descriptor of the lowest precedence value to the upper layers, if certain conditions are satisfied.

Second step (420), if no non-default matching URSP rule can be found and if UE local configuration for the application is available, the UE shall perform the association of the application to a PDU session accordingly. If no matching PDU session exists, the UE NAS layer shall attempt to establish a PDU session using UE local configuration. If the PDU session establishment is successful, the UE NAS layer shall provide information (e.g. PDU address) of the successfully established PDU session to the upper layers. Otherwise, UE goes to third step (430), if no non-default matching URSP rule can be found and if either UE local configuration for the application is not available or the PDU session establishment based on UE local configuration for the application was unsuccessful, the UE shall perform the association of the application to a PDU session or to non-seamless non-3GPP offload according to the default URSP rule with the "match-all" traffic descriptor, if any. If the association is unsuccessful, the UE shall inform the upper layers of the failure.

During the first step (410) of URSP rule evaluation, if the UE finds the traffic descriptor in a non-default URSP rule matching the application information, and if at least one of the route selection descriptors of the URSP rule contains a non-seamless non-3GPP offload indication and the information on the non-3GPP access outside of a PDU session is available, then the UE shall provide information on the non-3GPP access outside of a PDU session to the upper layers. In addition, if the UE finds the traffic descriptor in a non-default URSP rule matching the application information, and if there is one or more PDU sessions that satisfy certain exceptions or conditions, then the UE shall provide information on the PDU session that matches the route selection descriptor of the lowest precedence value to the upper layers. Here, a PDU session matches a RSD when the PDU session parameters are the same as the RSD descriptor components.

The first exception/condition is: the one or more PDU sessions matching at least one of the route selection descriptors of the URSP rule except the preferred access type and the multi-access preference, if any, wherein a route selection descriptor with PDU session type IPv4v6 matches also with PDU session type IPv4 if the network has sent 5GSM cause value #50 "PDU session type IPv4 only allowed" in the PDU SESSION ESTABLISHMENT ACCEPT message, a route selection descriptor with PDU session type IPv4v6 matches also with PDU session type IPv6 if the network has sent 5GSM cause value #51 "PDU session type IPv6 only allowed" in the PDU SESSION ESTABLISHMENT ACCEPT message, and a route selection descriptor with PDU session type IPv4v6 matches also with PDU session type IPv6 or IPv4 if the UE requested the PDU session type IPv4v6 but the selected PDU session type is set to IPv4 or IPv6 in the PDU session ESTABLISHMENT ACCEPT message.

The second exception/condition is: the one or more PDU sessions are established without requesting any parameter for which the matching route selection descriptor of the URSP rule does not provide a route selection descriptor component, except A) the preferred access type; B) the multi-access preference; C) the DNN, if one or more DNNs are included in the traffic descriptor, and the DNN provided by the application is the same as the DNN requested by the UE during the PDU session establishment; and D) the S-NSSAI, if the UE has only one S-NSSAI in the allowed NSSAI. In other words, the matched RSD includes a set of RSD descriptor components, and the existing PDU session is established with a set of parameters requested by the UE. The requested set of parameters is a subset of the set of RSD descriptor components of the matched RSD, with the exception of A), B), C), and D). For example, under exception D), if an existing PDU session is established with S-NSSAI and a set of parameters provided by the UE. If an application is matched with a URSP rule where its RSD includes only the set of parameters (without the S-NSSAI), then the application shall be associated with the existing PDU session.

Figure 5:
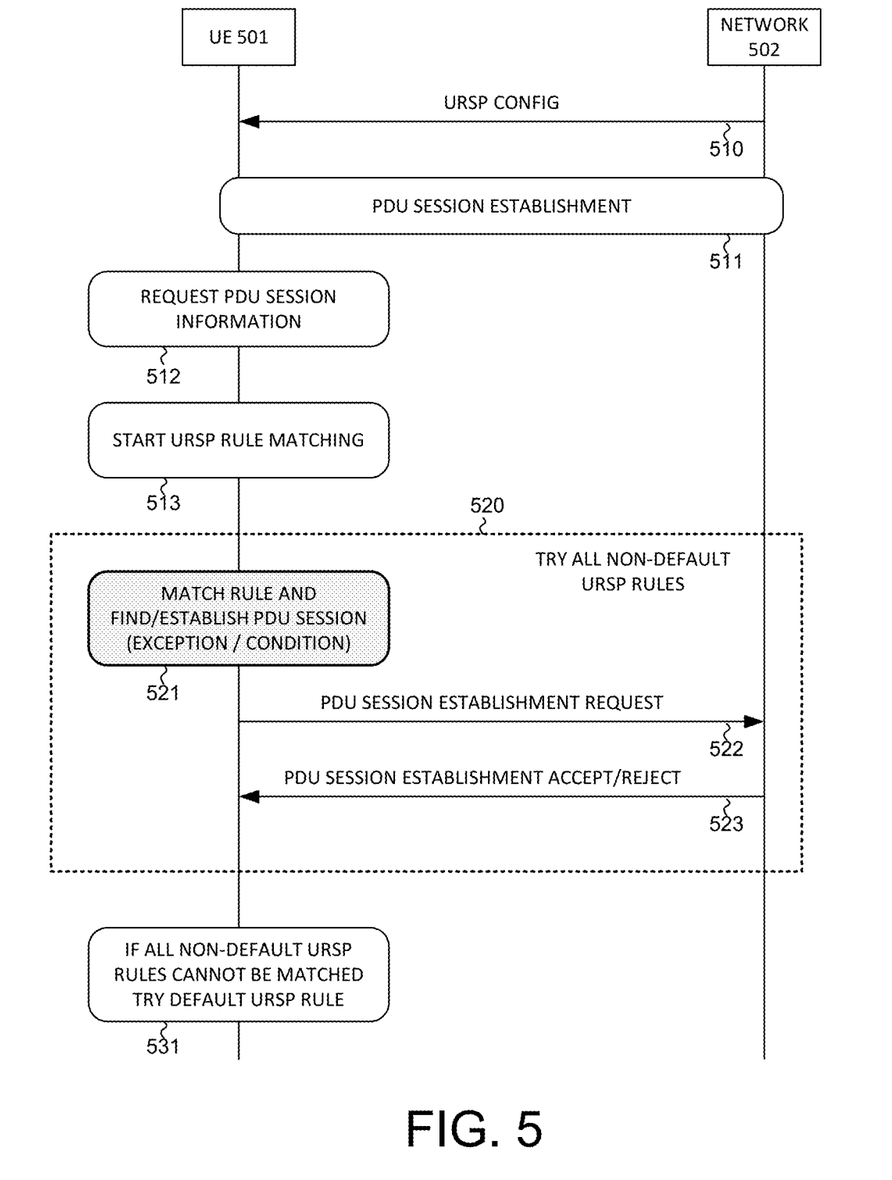
FIG. 5 illustrates a sequence flow between a UE and the network for URSP handling regarding S-NSSAI and PDU type in accordance with one novel aspect of the present invention.

FIG. 5 illustrates a sequence flow between a UE and the network for URSP rule matching in accordance with one novel aspect of the present invention. In step 510, network 502 (via PCF) provides URSP configuration or update to UE 501. URSP includes a set of URSP rules, including one default URSP rule. In step 511, UE 501 and network 502 established one or more PDU sessions, each PDU session comprises information including Serving NSSAI, DNN, and PDU session ID. In step 512, upper layer of UE 501 requests PDU session information, e.g., triggered by starting an application. In other words, the upper layers of the UE request information of the PDU session via which to send a PDU of an application. In order to determine association between the application and a PDU session or non-seamless non-3GPP offload, UE upper layers proceed with URSP rule matching in step 513. In step 520, UE 501 tries all non-default URSP rules in an increasing order of the precedence values. Specifically, in step 521, UE 501 selects a matching URSP rule, and then either finds existing PDU session, or establishes new PDU session, that matches at least one of the route selection descriptors of the selected URSP rule. If no matching PDU sessions exists, the UE NAS layer then attempts to establish a new PDU session. For example, in step 522, UE 501 sends a PDU session establishment request to the network. In step 523, the network sends a PDU session establishment accept to UE 501 and the PDU session is established successfully. Otherwise, the network sends a PDU session establishment reject to UE 501 and the PDU session is not established. After step 520, if all non-default URSP rules cannot be matched with the application, then in step 531, UE 501 tries the default URSP rule, which includes a match-all traffic descriptor. If the association is still unsuccessful, then UE 501 informs the upper layers of the failure.

In step 521, UE 501 tries to reuse the existing PDU session, e.g., the association of the application with the existing PDU session should be based on the matching between PDU session and RSD/URSP, but with some exceptions. Otherwise, there may be duplicated PDU sessions; or the network may reject the PDU session establishment request, which causes signaling overhead; or the UE may select the next RSD or URSP, which may not best fit the application. Specifically, if UE 501 finds the traffic descriptor in a non-default URSP rule matching the application information, and if there is one or more PDU sessions that satisfy certain conditions/exceptions, then the UE shall provide information on the PDU session that matches the route selection descriptor (RSD) of the lowest precedence value to the upper layers, even though some parameters of the PDU session do not have an exact match to the RSD of the matching URSP rule.

In one embodiment, based on the requirement of association between an application and an existing PDU session, the PDU type may have exceptions. This is because the network can also change the PDU session type=IPv4v6 request to either IPv4 or IPv6 without indicating the 5GSM cause (i.e., #50 "PDU session type IPv4 only allowed"/#51 "PDU session type IPv6 only allowed"). For example, it is possible that: 1) an IPv4 PDU session established without indicating #50/#51 when the UE requested to establish an IPv4v6 PDU session; 2) an IPv6 PDU session established without indicating #50/#51 when the UE requested to establish an IPv4v6 PDU session; and 3) an IPv4 PDU session and another IPv6 PDU session established without indicating #50/#51 when the UE initially requested to establish a single IPv4v6 PDU session. Therefore, the except handling for URSP PDU session association should include: a route selection descriptor with PDU session type IPv4v6 matches also with PDU session type IPv6 or IPv4 if the UE requested the PDU session type IPv4v6 but the selected PDU session type is set to IPv4 or IPv6 by the network in the PDU session ESTABLISHMENT ACCEPT message.

In another embodiment, the UE has only one S-NSSAI in the allowed NSSAI, or the UE is aware of the default S-NSSAI. Assume there is an existing PDU session established with S-NSSAI and a set of parameters provided by the UE. If a new application is executed, and the new application matches a URSP rule where the RSD includes only the set of parameters and has no S-NSSAI, e.g., the other parameters are exactly the same as the set of parameters provided for the established PDU session (i.e., the only difference is: S-NSSAI is provided when establishing the original PDU session), then the application should be associated with the existing PDU session (i.e., without checking whether the S-NSSAI is provided or not) as long as the other parameters are the same.

Figure 6:
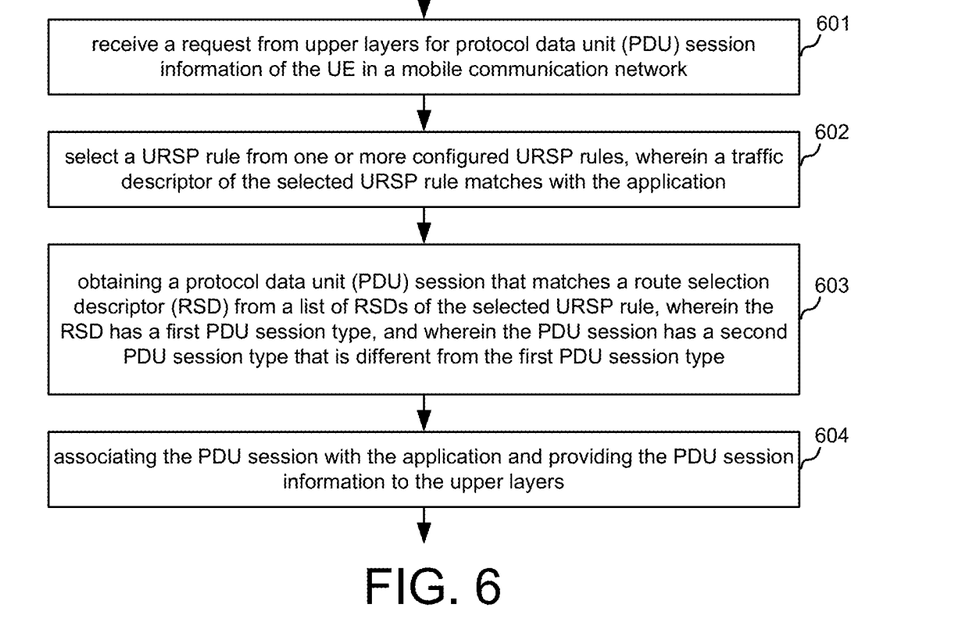
FIG. 6 is a flow chart of a method of enhanced URSP rule matching with exception on PDU session type in accordance with one novel aspect of the present invention.

FIG. 6 is a flow chart of a method of enhanced URSP rule matching with exception on PDU session type in accordance with one novel aspect of the present invention. In step 601, a UE receives a request from upper layers for protocol data unit (PDU) session information of the UE in a mobile communication network. For example, the upper layers request information of the PDU session via which to send a PDU of an application. In step 602, the UE selects a URSP rule from one or more configured URSP rules. A traffic descriptor of the selected URSP rule matches with the application. In step 603, the UE obtains a PDU session that matches a route selection descriptor (RSD) from a list of RSDs of the selected URSP rule. The RSD has a first PDU session type, and the PDU session has a second PDU session type that is different from the first PDU session type. In step 604, the UE associates the PDU session with the application and provides the PDU session information to the upper layers.

Figure 7:
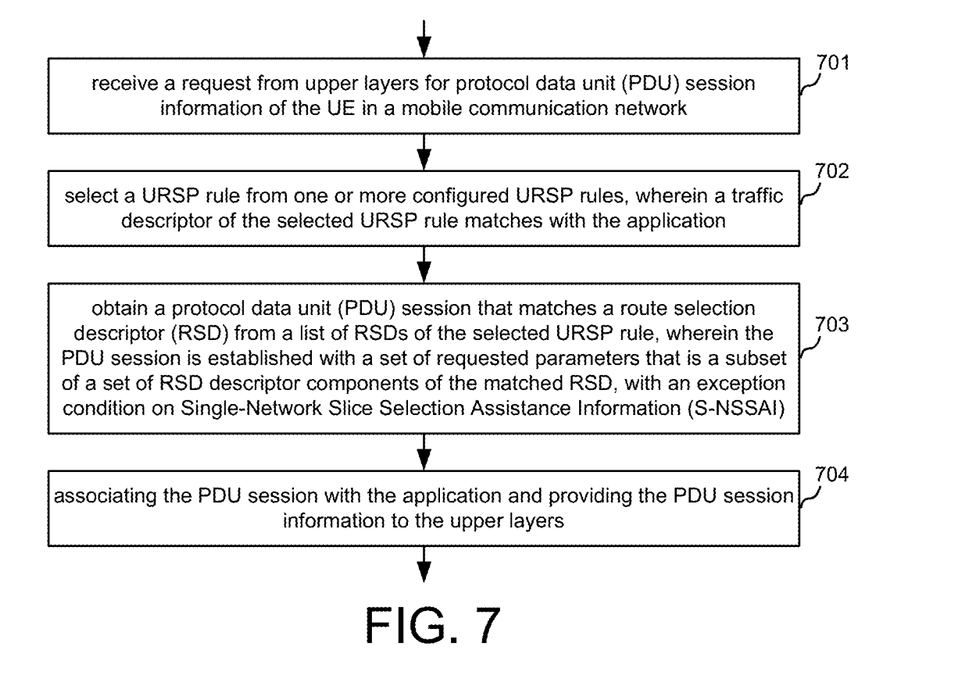
FIG. 7 is a flow chart of a method of enhanced URSP rule matching with exception on S-NSSAI in accordance with one novel aspect of the present invention.

FIG. 7 is a flow chart of a method of enhanced URSP rule matching with exception on S-NSSAI in accordance with one novel aspect of the present invention. In step 701, a UE receives a request from upper layers for protocol data unit (PDU) session information of the UE in a mobile communication network. For example, the upper layers request information of the PDU session via which to send a PDU of an application. In step 702, the UE selects a URSP rule from one or more configured URSP rules. A traffic descriptor of the selected URSP rule matches with the application. In step 703, the UE obtains a PDU session that matches a route selection descriptor (RSD) from a list of RSDs of the selected URSP rule. The PDU session is established with a set of requested parameters that is a subset of a set of RSD descriptor components of the matched RSD, with an exception condition on Single-Network Slice Selection Assistance Information (S-NSSAI). In step 704, the UE associates the PDU session with the application and provides the PDU session information to the upper layers.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of User Equipment (UE) Route Selection Policy (URSP) rule matching, comprising:
    receiving a request from upper layers for protocol data unit (PDU) session information of the UE in a mobile communication network;
    selecting a URSP rule from one or more configured URSP rules, wherein a traffic descriptor of the selected URSP rule matches with an application;
    obtaining a PDU session that matches a route selection descriptor (RSD) from a list of RSDs of the selected URSP rule, wherein the RSD has a first PDU session type set to IPv4v6, and wherein the PDU session has a second PDU session type set to IPv6 in a PDU SESSION ESTABLISHMENT ACCEPT message from the network; and
    associating the PDU session with the application and providing the PDU session information to the upper layers, wherein the UE does not receive any 5G session management (5GSM) cause value, or the UE receives a 5GSM cause value other than IPv6 only allowed.

2. A method of User Equipment (UE) Route Selection Policy (URSP) rule matching, comprising:
    receiving request from upper layers for protocol data unit (PDU) session information of the UE in a mobile communication network;
    selecting a URSP rule from one or more configured URSP rules, wherein a traffic descriptor of the selected URSP rule matches with an application;
    obtaining a PDU session that matches a route selection descriptor (RSD) from a list of RSDs of the selected URSP rule, wherein the PDU session is established with a set of requested parameters, wherein the UE has only one allowed S-NSSAI in an allowed NSSAI list, wherein the PDU session is established with the allowed S-NSSAI, and wherein the matched RSD has no S-NSSAI component; and
    associating the PDU session with the application and providing the PDU session information to the upper layers.

3. The method of claim 2, wherein the set of RSD descriptor components of the matched RSD is the same as the set of requested parameters of the PDU session minus the S-NSSAI.

4. A method of User Equipment (UE) Route Selection Policy (URSP) rule matching, comprising:
    receiving a request from upper layers for protocol data unit (PDU) session information of the UE in a mobile communication network;
    selecting a URSP rule from one or more configured URSP rules, wherein a traffic descriptor of the selected URSP rule matches with an application;
    obtaining a PDU session that matches a route selection descriptor (RSD) from a list of RSDs of the selected URSP rule, wherein the RSD has a first PDU session type set to IPv4v6, and wherein the PDU session has a second PDU session type set to IPv4 in a PDU SESSION ESTABLISHMENT ACCEPT message from the network; and
    associating the PDU session with the application and providing the PDU session information to the upper layers, wherein the UE does not receive any 5G session management (5GSM) cause value, or the UE receives a 5GSM cause value other than IPv4 only allowed.

* * * * *